United States Patent [19]

Clune

[11] 4,322,899
[45] Apr. 6, 1982

[54] SELF-PROPELLED, NON-RIDING TRENCHING MACHINE WITH A STEERING MECHANISM

[75] Inventor: Charles A. Clune, Minster, Ohio

[73] Assignee: Midmark Corporation, New Bremen, Ohio

[21] Appl. No.: 148,301

[22] Filed: May 9, 1980

[51] Int. Cl.³ .............................................. E02F 5/06
[52] U.S. Cl. ..................................... 37/86; 37/191 A
[58] Field of Search .................... 37/83, 80 R, 86, 89, 37/191 R, 191 A; 180/161-163, 6.3, 6.32, 253, 131, 132; 280/773, 774, 92, 93, 94

[56] References Cited

U.S. PATENT DOCUMENTS

| | | | |
|---|---|---|---|
| 2,817,167 | 12/1957 | Barber | 37/86 |
| 2,835,055 | 5/1958 | Hermes | 37/86 A |
| 2,874,793 | 2/1959 | Wagner | 180/161 |
| 2,946,142 | 7/1960 | Swanson | 37/86 |
| 2,997,276 | 8/1961 | Davis | 37/86 X |
| 3,006,427 | 10/1961 | Van der Lely | 180/161 X |
| 3,057,088 | 10/1962 | George et al. | 37/86 A |
| 3,087,354 | 4/1963 | Malzahn | 37/86 A X |
| 3,550,294 | 12/1970 | Fewell | 37/86 X |
| 3,750,762 | 8/1973 | Eaton | 173/8 |
| 3,788,415 | 1/1974 | Tilley | 180/161 X |
| 3,792,745 | 2/1974 | Files | 180/161 |
| 4,103,441 | 8/1978 | Flippin | 37/86 |
| 4,193,458 | 3/1980 | Meinert et al. | 172/328 |
| 4,241,577 | 12/1980 | Baldauf | 60/420 |

FOREIGN PATENT DOCUMENTS 2453079 7/1975 Fed. Rep. of Germany .......... 37/86

OTHER PUBLICATIONS

Sales brochure for Davis Trimline 120, Catalog No. P/NH006346, Mfg. by Davis Mfg., Witchita, Kansas 1977.
Sales Catalog by Ditchwitch, Model 1500 Trencher, Mfg. by Charles Machine Works, Inc., Perry, Ok. 73077, May 1978.

Primary Examiner—E. H. Eickholt
Attorney, Agent, or Firm—Biebel, French & Nauman

[57] ABSTRACT

A hydraulic steering mechanism is used in a self-propelled, non-riding trenching machine of the type having a chassis, a power source, a hydraulic pump driven by the power source, a reservoir supplying hydraulic fluid to the hydraulic pump and a digging boom. The steering mechanism includes a front wheel assembly journaled into the chassis, a double acting cylinder pivotally mounted to the chassis, a piston and rod slidably mounted within the cylinder and pivotally connected to the front wheel assembly, a first port located on one side of the piston and a second port located on an opposite side of the piston, and a manually operable three-position valve communicating with the hydraulic pump and the cylinder so that hydraulic fluid can be directed from the pump alternately to the first or second ports causing the rod alternately to extend or retract thereby rotating the front wheel assembly from side to side.

13 Claims, 8 Drawing Figures

SELF-PROPELLED, NON-RIDING TRENCHING MACHINE WITH A STEERING MECHANISM

BACKGROUND OF THE INVENTION

1. Field of the Invention

The present invention relates to self-propelled, non-riding trenching machines, and more particularly to self-propelled, non-riding trenching machines utilizing hydraulic steering mechanisms.

2. Prior Art

Typically, self-propelled, non-riding trenching machines range in weight from approximately 400 pounds to in excess of 1300 pounds and therefore are difficult to maneuver solely by the strength of the operator. These trenching machines have a single or double front wheel mounted on a chassis that is either freely pivoting or rigidly fixed so that it cannot be turned at all. In order to turn a trenching machine with a freely pivoting front wheel, it is necessary for the operator physically to turn in the trenching machine; the pivoting front wheel will then turn as the machine turns.

For those trenching machines that have a rigidly mounted front wheel, the operator must press down on the handle grips to raise the front wheel off the ground and pivot the entire trenching machine on the rear two wheels. This turning operation is difficult and clumsy, even with a well-balanced trenching machine. Indeed, since the operator must utilize his own body weight to press down the machine in order to raise the front wheels for turning, it is often impossible for a person weighing less than 150 pounds to turn a large machine.

When the trenching machine is in use digging trenches, sometimes it is necessary to turn the machine gradually as the trench is being dug in order to dig a curved trench. Therefore, it would be necessary for the operator to gradually turn the trenching machine as the digging process is underway. This gradual turning is extremely difficult if not impossible with both the fixed front wheel and pivoting front wheel trenching machines.

Therefore, there is a need for a trenching machine which has a steering mechanism which can turn the front wheel so that the operator does not have to rely upon his physical strength alone to tilt back or turn a heavy machine. In addition, it is desirable to have a steering mechanism which can gradually turn the trenching machine while the digging process is under way so that it can dig a curved trench. Such a steering mechanism also should require the use of only one hand so that an operator can use his other hand to grasp the trenching machine or to operate other controls.

SUMMARY OF THE INVENTION

The present invention provides a self-propelled non-riding trenching machine in which the front wheel is pivotally mounted to the chassis and is turned by a hydraulic cylinder which is remotely controlled by the operator. With such a steering mechanism for the front wheel, it is no longer necessary for the operator to use his physical strength and weight to turn the trenching machine. By merely displacing a lever on the dashboard of the trenching machine of the present invention, the operator can turn the front wheel and the self-propelled trenching machine will then be turned in the same direction. Therefore, there is no need for the trenching machine operator to be a person of great strength or weight.

In addition, the hydraulic system which turns the front wheel can be adjusted so that the front wheel is held in a turned position. This allows the trenching machine to be operated to dig a curved trench in which the radius of curvature is determined by the degree of rotation of the front wheel.

The steering mechanism of the present invention is used in a trenching machine of the type having a chassis, a power source, a hydraulic pump driven by the power source, a reservoir supplying hydraulic fluid to the hydraulic pump and a digging boom. The steering system comprises a front wheel assembly journaled into the chassis, a double acting cylinder pivotally mounted to the chassis and to the front wheel assembly, a piston rod slidably mounted within the cylinder and pivotally connected to the front wheel assembly, the cylinder having a first port located on one side of the piston and a second port located on an opposite side of the piston, and a manually operable three-position alve communicating with the hydraulic pump and the cylinder so that hydraulic fluid can be directed from the pump alternately to the first or second ports causing the rod alternately to extend or retract and thereby rotate the front wheel assembly.

The valve is operated by a steering lever which comprises a lever arm pivotally mounted to the chassis at a point intermediate its ends, a handle extending substantially perpendicular to the lever arm at an end thereof, and a linkage extending between an opposite end of the lever arm and the valve means. Thus, by displacing the handle of the steering lever, a spool in the three-position valve is moved and the hydraulic fluid is directed to the appropriate port of the cylinder.

In order to fix the front wheel at a predetermined turning angle, the wheel is first turned to the desired angle and the lever arm is then positioned so that the spool in the hydraulic valve is in the neutral position so that hydraulic fluid is merely circulated through the valve back to the pump. The hydraulic fluid in the lines from the valve to the cylinder is prevented from moving, thus locking the piston within the cylinder.

Accordingly, it is an object of this invention to provide a steering system in which a hydraulic cylinder is remotely controlled by the operator to turn the front wheel of a trenching machine; to provide a steering system which can be operated by one hand of the operator thus allowing the operator to use his other hand to grasp the trenching machine or operate other controls; to provide a means for fixing the steering wheel at a predetermined angle of turn so that the trenching machine can dig a curved trench; and to provide a steering means so that the trenching machine can be turned without the necessity of tilting it back on its rear wheels or physically pivoting the entire machine in the desired direction.

Other objects and advantages of the invention will be apparent from the following description, the accompanying drawings and the appended claims.

DETAILED DESCRIPTION OF THE PREFERRED EMBODIMENT

Figure 1:
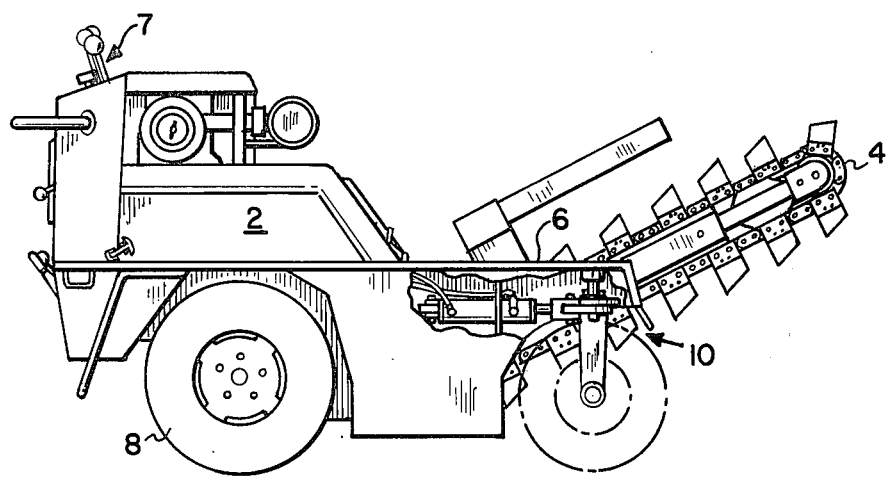
FIG. 1 is a side elevation of the trenching machine of the present invention partially broken away to show a portion of the steering mechanism.

As shown in FIG. 1, the trenching machine of the present invention includes a chassis 2, digging boom 4, front fender 6, control panel 7, and rear tires 8. The steering mechanism, generally designated 10, is arranged within the chassis 2 so that it can be operated from the control panel 7 by an operator stationed at the rear of the machine.

Figure 2:
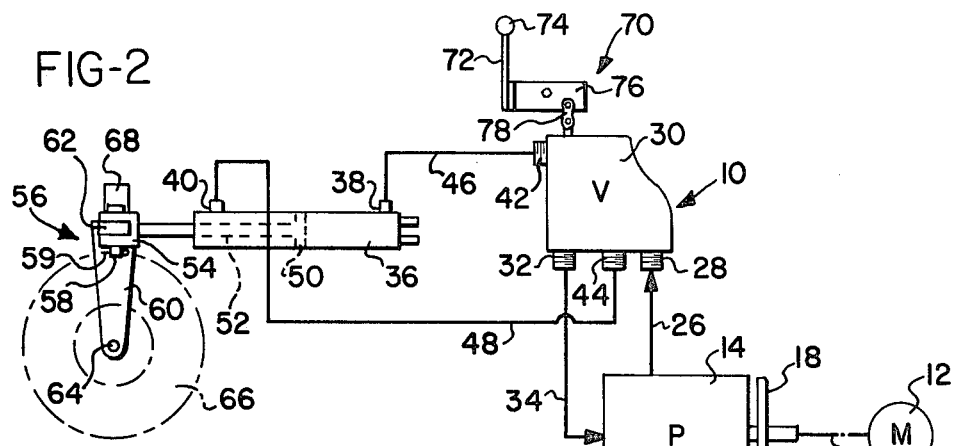
FIG. 2 is a schematic representation of the steering system of the present invention.

As shown in FIG. 2, the steering mechanism 10 is driven by a power source, typically an internal combustion gasoline or diesel engine 12. A variable displacement hydraulic pump 14 is connected to an output shaft 16 of the engine 12 by means of a flexible coupling 18. The hydraulic pump 14 is connected to a reservoir 20 by means of a feed line 22 carrying a filter 23 and a case drain line 24. In addition to comprising an integral part of the steering mechanism 10, the pump 14 can be used to power other elements of the trenching machine, such as a hydraulic motor for driving the digging chain.

A pressure line 26 from the hydraulic pump 14 is connected to an inlet port 28 of a three-position directional control valve 30. An outlet port 32 of the control valve 30 is connected to a return line 34 which is connected to the pump 14.

A double acting hydraulic cylinder 36 has a first port 38 and a second port 40 which communicate, respectively, with a first work port 42 and a second work port 44 of the directional control valve 30 by way of a first cylinder line 46 and a second cylinder line 48, respectively. The double acting hydraulic cylinder 36 includes a piston 50 and a rod 52 which terminates in a clevis 54 for attachment to a front wheel assembly, generally designated 56, by means of a clevis pin 58 and cotter pin 59.

The wheel assembly 56 consists of a flat body plate 60 having an arm 62 projecting outwardly which engages the clevis 54 of the rod and is secured thereto by the clevis pin 58 and cotter pin 59. An axle 64 extends from the lower portion of the body plate 60 and is substantially parallel to the arm 62. A wheel 66 is rotatably mounted to the axle and secured thereon by means of a cotter pin (not shown). A shaft 68 fixed with respect to body plate 60 extends upwardly from the top of the body plate and is coaxial with a longitudinal axis of symmetry of the body plate.

The operation of the directional control valve 30 is controlled by a steering lever, generally designated 70. The steering lever 70 consists of a handle 72, knob 74, and an L-shaped lever arm 76. The handle 72 and lever arm 76 can be made of metal and be joined by welds. The lever arm is connected to a spring-loaded control spool (not shown) within the directional control valve 30 by means of a linkage 78.

Figure 3:
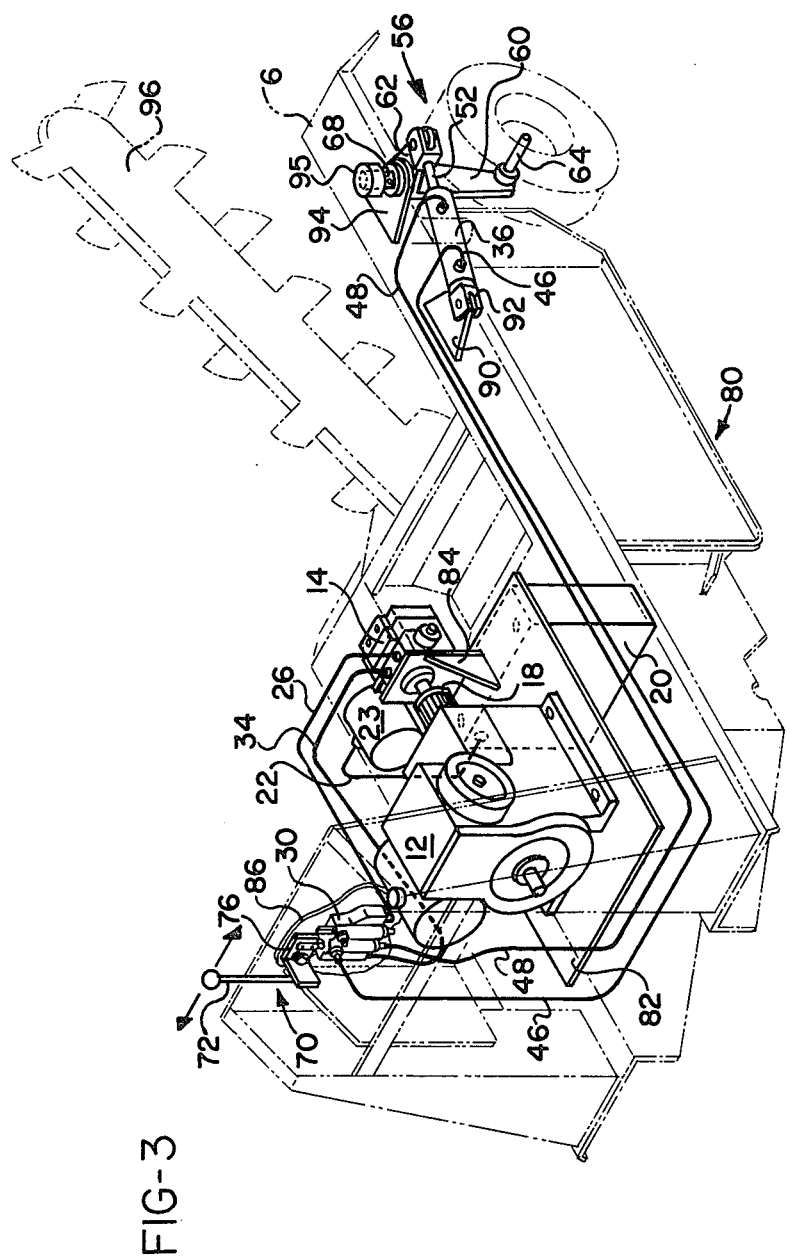
FIG. 3 is a perspective view of the steering system as mounted in a trenching machine.

The arrangement of the steering mechanism 10 of the present invention within a trenching machine chassis 2 is shown in FIGS. 2 and 3. The engine 12 is mounted on a floor plate 82 which also supports a mounting bracket 84 to which is attached the variable displacement hydraulic pump 14. Below the mounting bracket 84 is positioned the reservoir 20. The directional control valve 30 is mounted on the interior of the chassis 2 on a rear wall 86.

Figure 5:
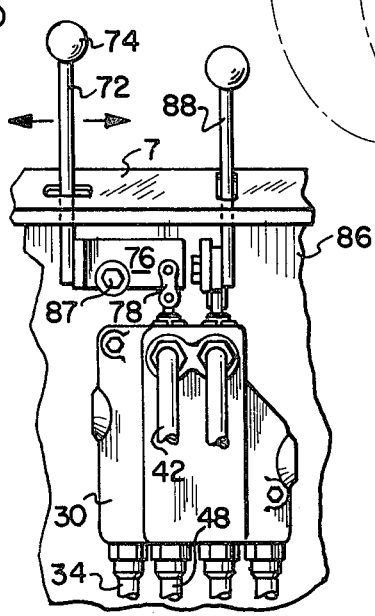
FIG. 5 is a partial rear elevation of the trenching machine of the present invention broken away to show a portion of the steering mechanism.

As shown in FIGS. 3 and 5, the lever arm 76 of the steering lever 70 is pivotally mounted by bolt 87 on the rear wall 86 above the control valve 30 so that the handle 72 may extend above the chassis 2 so that the control valve 30 can be operated from the control panel 7. The lever arm 76 is attached to the rear wall 86 at its center so that a movement of the handle 72 to the left causes the spool of the control valve 30 to be displaced upwardly and a movement of the handle to the right causes a movement of the spool downwardly. As seen in FIG. 5, the control valve 30 can be of the type having two spools so that a second handle 88 controlling a second spool (not shown) for use in operating another mechanism of the trenching machine, such as a cylinder to position the digging boom 4. Thus, the second handle 88 can be positioned on the control panel 7 adjacent handle 72.

Figure 4:
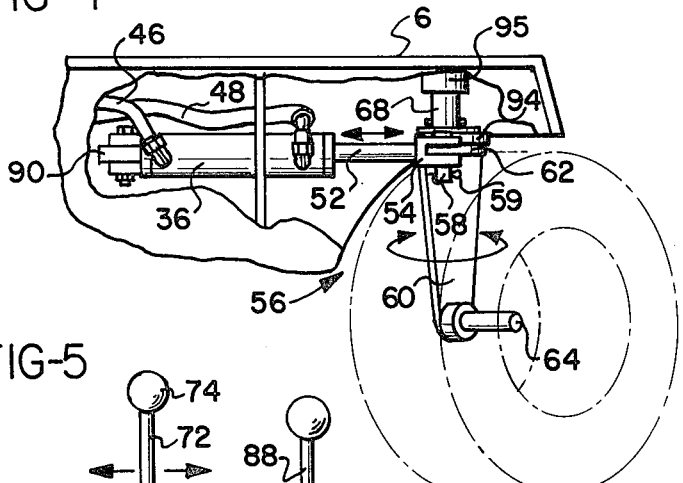
FIG. 4 is a partial side elevation of the trenching machine of the present invention broken away to show a portion of the steering mechanism.

As best shown in FIGS. 3 and 4, the double acting hydraulic cylinder 36 and front wheel assembly 56 are located in the front fender 6 of the chassis 2. The rearward portion of the cylinder 36 is attached to the chassis 2 at a first flange 90 by a second clevis and pin combination 92. The shaft 68 of the wheel assembly 56 is journaled into a second flange 94 and a collar 95 of the front fender 6 and is retained there by a cotter pin (not shown) in a manner well-known in the art. Thus, in the embodiment of FIGS. 1, 3 and 4, an extension of the rod 52 from the cylinder 36 would cause the wheel assembly 56 to rotate to the left and a retraction of the rod into the cylinder would cause a rotation of the wheel assembly in an opposite direction, turning the wheel to the right.

In order to distribute the weight evenly, the wheel assembly 56 and front fender 6 are located adjacent a digging boom 4 of the trenching machine.

Figure 6:
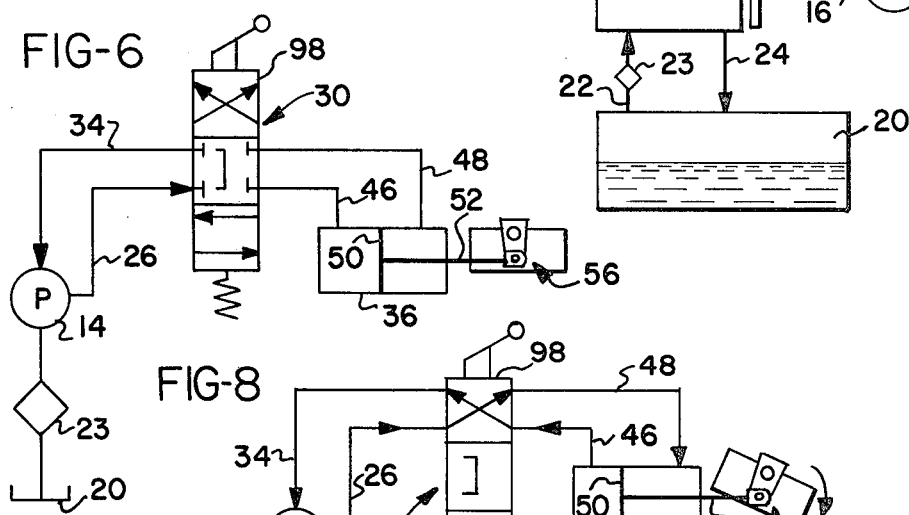
FIG. 6 is a hydraulic schematic of the present invention showing the valve in the first position.
Figure 8:
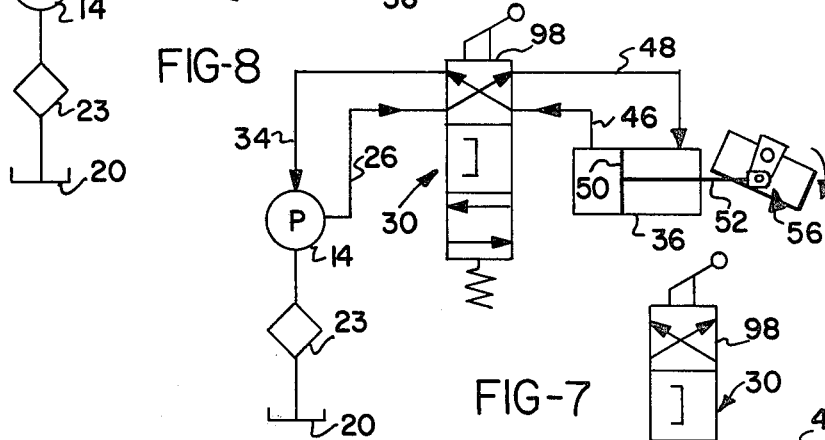
FIG. 8 is a hydraulic schematic of the present invention showing the valve in the third position.
Figure 7:
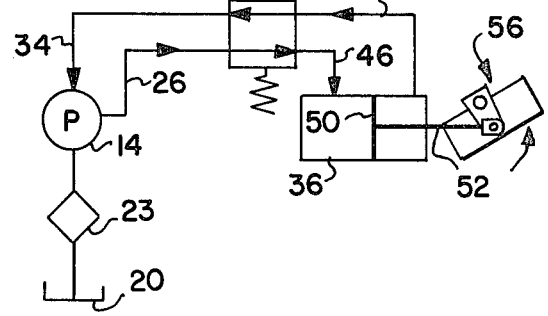
FIG. 7 is a hydraulic schematic of the present invention showing the valve in the second position.

The operation of the steering mechanism 10 is shown in FIGS. 6, 7, and 8. In FIG. 6 a spring loaded control spool 98 of the control valve 30 is shown schematically in a first position wherein hydraulic fluid is pumped from the reservoir 20 through a filter 23 by the pump 14 which forces the fluid through the pressure line 26 to the control valve 30. The control valve 30 merely recirculates the fluid, sending it back to the pump 14 through the return line 34. In addition, the control spool 98 shuts off fluid flow through the first cylinder line 46 and the second cylinder line 48. Thus, the fluid in the first and second cylinder lines 46, 48 holds the piston 50 within the cylinder 36 thereby maintaining the wheel assembly 56 in a given position.

In FIG. 7, the control spool 98 is shown in a second position. When the steering lever 70 is moved to the left, the spring loaded control spool 98 is moved upwardly, thereby opening a passageway from the pump 14 through the control valve 30 and through the first port 38 of the double acting hydraulic cylinder 36. Fluid entering this portion of the cylinder 36 forces the piston 50 and rod 52 outward thereby pivoting the wheel assembly 56 to the left. The fluid on the opposite side of the piston 50 is forced out through the second port 40 to the second cylinder line 48 and back through the control valve 30 to the pump by way of the return line 34.

In a third position, shown in FIG. 8, the steering lever 70 has been moved to the right thus depressing the control spool 98 within the control valve 30. Fluid entering the control valve 30 through the pressure line 26 is directed to the second cylinder line 48 thereby entering the double acting hydraulic cylinder 36 through the second port 40. As this fluid enters the second port 40, the piston 50 is forced backward and the rod 52 is retracted into the cylinder 36 turning the wheel assembly 56 to the right. As the piston moves backward into the cylinder 36, it forces fluid out of the first port 38 through the first cylinder line 46 and back to the pump 14 by way of the return line 34.

It should be noted that the movement of the piston 50 within the cylinder 36 can be stopped at any position thereby holding the wheel assembly 56 at a given turning angle. Thus, the trenching machine can be adjusted to dig a trench having a given radius of curvature.

A suitable directional control valve 30 can be the two-spool directional control valve model 31932-C manufactured by Cessna Fluid Power Division in Hutchison, Kansas. The variable displacement pump 14 can be a Series 15 hydraulic pump manufactured by Sunstrand Corporation located in Ames, Iowa. A two-spool directional control valve is recommended so that other mechanical elements of the trenching machine— for example, a digging boom raising and lowering means—can be hydraulically controlled from the same valve at the control panel.

Other elements of the steering mechanism can be fabricated from medium strength steel. The pressures generated in the steerng mechanism lines and valves do not exceed 800 p.s.i. so the pressure line, return line, first cylinder line, and second cylinder line need not be a high strength or heavy duty type hydraulic tubing.

While the form of apparatus herein described constitutes a preferred embodiment of this invention, it is to be understood that the invention is not limited to this precise form of apparatus, and that changes may be made therein without departing from the scope of the invention.

What is claimed is:

1. In a nonridable, trenching machine of the type having a chassis, a power source, a hydraulic pump driven by the power source, a reservoir supplying hydraulic fluid to the hydraulic pump, and a digging boom cantilevered outwardly from a front portion of the chassis; the improvement comprising:
    front fender means extending outwardly from the front portion and being adjacent and parallel to the digging boom;
    a front wheel assembly journaled into the fender means;
    a double acting cylinder extending between the chassis and the front wheel assembly; and
    manually operable valve means located on a rearmost portion of the chassis and communicating with the hydraulic pump and the cylinder such that hydraulic fluid is directed from the pump to the cylinder to selectively rotate the front wheel assembly.

2. The trenching machine of claim 1 wherein the front wheel assembly comprises:
    a substantially flat body disposed generally vertically below the front fender means;
    a flange projecting outwardly from the body such that it is substantially perpendicular thereto and pivotally connected at an end to the piston rod;
    an axle projeecting outwardly from the body such that it is substantially parallel to the flange; and
    a wheel rotatably mounted on the axle.

3. The trenching machine of claim 2 wherein the front wheel assembly includes a post extending upwardly from the body and journaled into the front fender means.

4. The trenching machine of claim 2 wherein the cylinder is pivotally mounted to a flange on the front fender means.

5. The trenching machine of claim 1 wherein the valve means is operated by a steering lever.

6. The trenching means of claim 5 wherein the steering lever comprises:
    a lever arm pivotally mounted to the chassis at a point intermediate its ends, a handle extending substantially perpendicular to the lever arm at an end, and a linkage extending between an opposite end of the lever arm and the valve means.

7. In a nonridable trenching machine of the type having a chassis, a power source, a hydraulic pump driven by the power source, a reservoir supplying hydraulic fluid to the hydraulic pump, and a digging boom cantilevered outwardly from a front portion of the chassis, a steering mechanism comprising:
    front fender means extending outwardly from the front portion and being adjacent and parallel to the digging boom;
    a front wheel assembly journaled into the fender means;
    a double acting cylinder extending between the chassis and the front wheel assembly;
    a piston and rod slidably mounted within the cylinder;
    the cylinder having a first port located on one side of the piston and a second port located on an opposite side of the piston; and
    manually operable valve means located on a rearmost portion of the chassis and communicating with the hydraulic pump and the cylinder such that hydraulic fluid is directed from the pump alternately to the first or second ports causing the rod alternately to extend or retract thereby rotating the front wheel assembly.

8. The steering mechanism of claim 7 wherein the front wheel assembly comprises:
    a substantially flat body disposed generally vertically below the front fender means;
    a flange projecting outwardly from the body such that it is substantially perpendicular thereto, and pivotally connected at an end to the rod;
    an axle projecting outwardly from the body and substantially parallel to the flange; and
    a wheel rotatably mounted on the axle.

9. The steering mechanism of claim 8 wherein the front wheel assembly further includes a post extending outwardly from the body and journaled into the front fender means.

10. The steering mechanism of claim 7 wherein the valve means comprises a three-position hydraulic valve having:
    a first position whereby hydraulic fluid is directed from the pump and is recirculated to the pump and does not flow to the cylinder;

a second position whereby hydraulic fluid is directed from the pump to the first port to cause the rod to extend outwardly from the cylinder to rotate the front wheel assembly in a predetermined direction; and a third position whereby hydraulic fluid is directed from the pump to the second port to cause the rod to retract into the cylinder to rotate the front wheel assembly in an opposite direction.

11. The steering mechanism of claim 7 wherein the valve means is operated by a steering lever.

12. The steering mechanism of claim 11 wherein the steering lever comprises a lever arm pivotally attached to the chassis at a point intermediate its ends, a handle extending substantially perpendicular to the lever arm at an end, and a linkage extending between an opposite end of the lever arm and the valve means.

13. In a nonridable trenching machine of the type having a chassis, a power source, a hydraulic pump driven by the power source, a reservoir supplying hydraulic fluid to the hydraulic pump, and a digging boom cantilevered outwardly from a front portion of the chassis, a steering means comprising:

front fender means extending outwardly from the front portion and being adjacent and parallel to the digging boom;

a front wheel assembly having a substantially flat body disposed generally vertically below the fender means, a flange projecting outwardly from the body such that it is substantially perpendicular thereto, an axle projecting outwardly from the body and substantially parallel to the flange, a wheel rotatably mounted on the axle, and a post extending outwardly from the body and journaled into the fender means;

a double acting cylinder pivotally mounted to flange and the chassis and extending therebetween;

a piston and rod slidably mounted within the cylinder and pivotally connected to the front wheel assembly;

the cylinder having a first port located on one side of the piston and a second port located on an opposite side of the piston;

a manually operable three-position hydraulic valve located on a rearmost portion of the chassis and having a first position whereby hydraulic fluid is directed from the pump, is recirculated to the pump and does not flow into the cylinder, a second position whereby hydraulic fluid is directed from the pump to the first port to cause the rod to extend outwardly from the cylinder to rotate the front wheel assembly in a predetermined direction, and a third position whereby hydraulic fluid is directed from the pump to the second port to cause the rod to retract into the cylinder to turn the front wheel assembly in an opposite direction, a steering lever arm pivotally attached to the chassis at a point intermediate its ends;

a handle extending substantially perpendicularly to the lever arm at an end; and a linkage extending between an opposite end of the lever arm and the valve means.

* * * * *

UNITED STATES PATENT AND TRADEMARK OFFICE
CERTIFICATE OF CORRECTION

PATENT NO. : 4,322,899
DATED : April 6, 1982
INVENTOR(S) : Charles A. Clune

It is certified that error appears in the above—identified patent and that said Letters Patent is hereby corrected as shown below:

On the cover page of the patent, the address of the Assignee, Midmark Corporation, should read --Minster, Ohio--, not "New Bremen, Ohio."

Signed and Sealed this

Twenty-ninth Day of June 1982

[SEAL]

Attest:

GERALD J. MOSSINGHOFF

*Attesting Officer*  *Commissioner of Patents and Trademarks*